US009268359B2

(12) United States Patent
Chung (10) Patent No.: US 9,268,359 B2
(45) Date of Patent: Feb. 23, 2016

(54) TABLET APPARATUS

(71) Applicant: SAMSUNG Electronics Co., Ltd., Suwon-si, Gyeonggi-do (KR)

(72) Inventor: Won Suk Chung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 234 days.

(21) Appl. No.: 14/011,793

(22) Filed: Aug. 28, 2013

(65) Prior Publication Data

US 2014/0063714 A1    Mar. 6, 2014

(30) Foreign Application Priority Data

Aug. 29, 2012  (KR) .............................. 10-2012-95177

(51) Int. Cl.
*G06F 1/16* (2006.01)

(52) U.S. Cl.
CPC .............. *G06F 1/1613* (2013.01); *G06F 1/162* (2013.01); *G06F 1/1626* (2013.01); *G06F 1/1654* (2013.01)

(58) Field of Classification Search
CPC ........................................................ G06F 1/16
USPC ............. 361/679.01–679.45, 679.55–679.61, 361/724–747, 752–759, 796–837
See application file for complete search history.

(56) References Cited

U.S. PATENT DOCUMENTS

| | | | | |
|---|---|---|---|---|
| 4,859,092 A * | 8/1989 | Makita | ............................. | 400/83 |
| 5,255,214 A * | 10/1993 | Ma | ........................... | 361/679.06 |
| 5,644,469 A * | 7/1997 | Shioya et al. | ............ | 361/679.06 |
| 5,900,848 A * | 5/1999 | Haneda et al. | ................. | 345/1.1 |
| 6,005,767 A * | 12/1999 | Ku et al. | .................... | 361/679.27 |
| 6,055,767 A * | 5/2000 | Carter | ............................. | 43/137 |
| 6,198,624 B1 * | 3/2001 | Margaritis | ............... | 361/679.05 |
| 6,233,138 B1 * | 5/2001 | Osgood | ..................... | 361/679.05 |
| 6,262,885 B1 * | 7/2001 | Emma et al. | ............. | 361/679.05 |
| 6,266,236 B1 * | 7/2001 | Ku et al. | .................... | 361/679.27 |
| 6,392,877 B1 * | 5/2002 | Iredale | ..................... | 361/679.05 |
| 6,464,195 B1 * | 10/2002 | Hildebrandt | .................. | 248/460 |
| 6,532,147 B1 * | 3/2003 | Christ, Jr. | .................. | 361/679.27 |
| 6,539,208 B1 * | 3/2003 | Mori | .......................... | 455/575.3 |
| 6,665,175 B1 * | 12/2003 | deBoer et al. | ............ | 361/679.06 |
| 6,826,043 B2 * | 11/2004 | Chang | ...................... | 361/679.27 |
| 7,127,776 B2 * | 10/2006 | Park | ............................... | 16/239 |
| 7,251,128 B2 * | 7/2007 | Williams et al. | ......... | 361/679.55 |
| 7,492,580 B2 * | 2/2009 | Lee | .......................... | 361/679.27 |
| 7,549,246 B2 * | 6/2009 | Kuo | ................................ | 40/601 |
| 7,566,033 B2 * | 7/2009 | Schwager et al. | ......... | 248/125.9 |
| 7,599,181 B2 * | 10/2009 | Chuang et al. | ........... | 361/679.55 |
| 7,652,873 B2 * | 1/2010 | Lee | .......................... | 361/679.06 |
| 7,724,511 B2 * | 5/2010 | Jacobs | ..................... | 361/679.27 |
| 8,023,283 B2 * | 9/2011 | Cheng et al. | .................. | 361/801 |
| 8,050,030 B2 * | 11/2011 | Wu et al. | .................. | 361/679.58 |
| 8,228,345 B2 * | 7/2012 | Brown et al. | ................. | 345/634 |
| 8,264,828 B2 * | 9/2012 | Chang et al. | ............. | 361/679.28 |
| 8,289,685 B2 * | 10/2012 | Li et al. | ..................... | 361/679.26 |
| 8,390,997 B1 * | 3/2013 | Dominy et al. | .......... | 361/679.27 |
| 8,706,174 B2 * | 4/2014 | Koike | ........................ | 455/575.3 |

(Continued)

*Primary Examiner* — Courtney Smith
*Assistant Examiner* — Rashen E Morrison
(74) *Attorney, Agent, or Firm* — Staas & Halsey LLP (57) ABSTRACT

A tablet apparatus includes a first member which is provided with a keyboard, and a second member which is provided with a display portion and covers an upper surface of the first member. The first and second members are connected to each other through a link member such that the second member may be guided through the link member and move in various positions with respect to the first member.

8 Claims, 6 Drawing Sheets

(56) References Cited

U.S. PATENT DOCUMENTS

| | | | |
|---|---|---|---|
| 8,724,312 B2* | 5/2014 | Jones et al. | 361/679.44 |
| 2003/0103324 A1* | 6/2003 | Gallivan | 361/681 |
| 2005/0206615 A1* | 9/2005 | Tanimoto et al. | 345/156 |
| 2008/0137273 A1* | 6/2008 | Li et al. | 361/681 |
| 2012/0262495 A1* | 10/2012 | Kobayashi et al. | 345/672 |
| 2012/0276958 A1* | 11/2012 | Inami | 455/566 |
| 2013/0242521 A1* | 9/2013 | Lin et al. | 361/807 |

\* cited by examiner

TABLET APPARATUS

CROSS-REFERENCE TO RELATED APPLICATIONS

This application claims priority under 35 U.S.C. §119 from Korean Patent Application No. 2012-95177, filed on Aug. 29, 2012 in the Korean Intellectual Property Office, the disclosure of which is incorporated herein by reference in its entirety.

BACKGROUND OF THE INVENTION

1. Field of the Invention

Embodiments of the present general inventive concept relate to a tablet apparatus which includes a keyboard and a display portion having a touchscreen.

2. Description of the Related Art

Recently, there have been widely used electronic apparatuses equipped with a display panel in which an image is displayed on an upper surface of a main body formed in a rectangular plate shape so as to be easy to carry.

In addition, among such electronic apparatuses, there is a tablet apparatus in which a display portion to display an image is constituted by a touchscreen and a user may input a command through the display portion.

SUMMARY OF THE INVENTION

The present general inventive concept provides a tablet apparatus capable of being utilized in various manners by moving a second member provided with a display portion to various positions.

The present general inventive concept also provides a tablet apparatus capable of allowing a user to conveniently view a display portion on which a screen is displayed.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a tablet apparatus including a first member, a second member which is formed in a shape corresponding to the first member to cover an upper surface of the first member, and at least one link member, a first end of which, positioned at one side, is mounted to the upper surface of the first member to be rotatable in a forward and rearward direction, and a second end of which, positioned at the other side opposite to the first end, is mounted to a lower surface of the second member to be rotatable in the forward and rearward direction.

The first member may include a keyboard, which is provided on the upper surface thereof to receive a user input.

The second member may include a display portion, which is provided on an upper surface thereof to display an image corresponding to a function of the tablet apparatus.

The display portion may include a touchscreen.

The at least one link member may have a bar shape and include a pair of link members to connect both sides of the first and second members.

The second member may move to a first position in which the second member covers the upper surface of the first member, a second position in which the second member is erected on the first member, and a third position in which the second member is erected from a rear side of the first member.

The second member may be erected to be spaced upward from the rear side of the first member in the third position.

The first member may include a support portion which is provided on the upper surface thereof and by which a lower end of the second member located in the second position is caught and supported.

The link member may have a length longer than one half of a width of each of the first and second members in a forward and rearward direction thereof, the first end may be mounted to a rear side of the upper surface of the first member, and the second end may be mounted to a front side of the lower surface of the second member.

The link member may have a length corresponding to one half of a width of each of the first and second members in a forward and rearward direction thereof, the first end of the link member may be mounted to a rear side of the upper surface of the first member, and the second end may be mounted to a central side of the lower surface of the second member in a forward and rearward direction thereof.

The foregoing and/or other features and utilities of the present general inventive concept may also be achieved by providing a tablet apparatus including a first member which is provided, on an upper surface thereof, with a keyboard, a second member which is provided, on an upper surface thereof, with a display portion for display and covers the upper surface of the first member, and at least one link member, a first end of which, positioned at one side, is mounted to the upper surface of the first member to be rotatable in a forward and rearward direction, and a second end of which, positioned at the other side opposite to the first end, is mounted to a lower surface of the second member to be rotatable in the forward and rearward direction, wherein the link member has a length longer than one half of a width of each of the first and second members in a forward and rearward direction thereof.

The foregoing and/or other features and utilities of the present general inventive concept may also be achieved by providing a tablet apparatus including a first member, a second member having a display portion, and at least one link member having a first end rotatably connected to an end portion of the first member and a second end rotatably connected to a middle portion of the second member.

The at least one link member may have a length longer that a distance between the middle portion of the second member and an end portion of the second member.

The at least one link member may have a length longer than a half of a width of at least one of the first member and the second member.

The first member may include a portion to accommodate the at least one link member when the first member and the second member are folded.

The first member may include a keyboard and at least one portion disposed on a side of the keyboard to receive the at least one link member when the middle portion of the second member is disposed to face the keyboard of the first member.

The at least one link member may have a dimension smaller than a dimension of the at least one portion of the first member.

The at least one portion of the first member may include a recess formed from a surface of the keyboard.

The first member may include a keyboard section, a touch pad section, and a portion disposed adjacent to the keyboard section to correspond to the at least one link member.

The first member may include a keyboard section, a touch pad section, and a support portion formed between the keyboard section and the touch pad section to support an end portion of the second member when the second member and the at least one link member rotate with respect to the first member.

The first member may include a support portion having a height from a surface of the first member to contact and support an end portion of the second member when the second member and the at least one link member rotate such that the second member is disposed to have an angle with the first member.

The first member may include a support portion spaced apart from the end portion of the first member to which the first end of the at least one link member is connected by a distance.

The distance may be longer than a length of the at least one link member.

The first member may include a support portion to support an end portion of the second member when the second member is disposed to have an angle with the first member, the middle portion may be spaced apart from the end portion of the first member by a first distance, and the support portion may be spaced apart from the end portion of the first member by a second distance different from the first distance.

The second member and the at least one link member may rotate with respect to the first member such that the second member and the at least one link member form a same angle with a surface of the first member.

The second member and the at least one link member may be disposed to form a same angle with a surface of the first member, and the second member may include an end portion spaced apart from the end portion of the first member by a distance.

The middle portion of the second member may be disposed between a center portion of the second member and an end portion of the second member.

The tablet apparatus may further include at least one first hinge unit disposed between the first end of the at least one link member and the end portion of the first member; and at least one second hinge unit disposed between the second end of the at least one link member and the middle portion of the second member.

The first hinge unit may be spaced apart from a side end portion of the first member by a first distance, and the second hinge unit may be spaced apart from a side end portion of the second member by a second distance shorter than the first distance.

The first hinge unit may be disposed on a side portion of the first end of the at least one link member, and the second hinge unit may be disposed on a center portion of the second end of the at least one link member.

The end portion of the first member connected to the first end of the at least one link member may be disposed away from a peripheral portion of the first member, and the middle portion of the second member connected to the second end of the at least one link member may be disposed closer to a peripheral portion of the second member.

The foregoing and/or other features and utilities of the present general inventive concept may also be achieved by providing a tablet apparatus including a first member having a keyboard, a second member having a display portion and to communicate with the first member, and at least one link member having a first end rotatably connected to an end portion of the first member and a second end rotatably connected to a middle portion of the second member, wherein the link member may have a length longer than a distance between the middle portion and an end portion of the second member in a lengthwise direction of the link member.

The link member may contact a variable area of the second member according to an angle formed between the first member and the second member.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

As illustrated in FIGS. 1 to 4, a tablet apparatus according to an embodiment of the present general inventive concept includes a first member 10 and a second member 20 which is formed in a shape corresponding to the first member 10 to cover an upper surface of the first member 10. In the present embodiment, the first and second members 10 and 20 have a rectangular plate shape.

The first member 10 includes a keyboard 11 which is provided on a portion of the upper surface thereof and allows a user to input a variety of commands and data as a user input to perform at least one of functions of the tablet apparatus, and a touch pad 12 to indicate and/or select at least one of the functions of the tablet apparatus, for example. A mouse (not illustrated) may be connected to the first member 10 to control the function of the tablet apparatus. The second member 20 includes a display portion 21, which is provided on an upper surface thereof to display one or more images and/or icons corresponding to the function of the tablet apparatus. The display portion 21 may include a touchscreen, and a user inputs commands or data as a user input through the display portion 21. A controller of the tablet apparatus disposed in at least one of the first member 10 and the second member 20 controls the display portion 21 to display at least one of an image, an icon, and a user interface corresponding to a function of the tablet apparatus. Accordingly, the second member 20 may cover the keyboard 11 provided on the upper surface of the first member 10.

Figure 1:
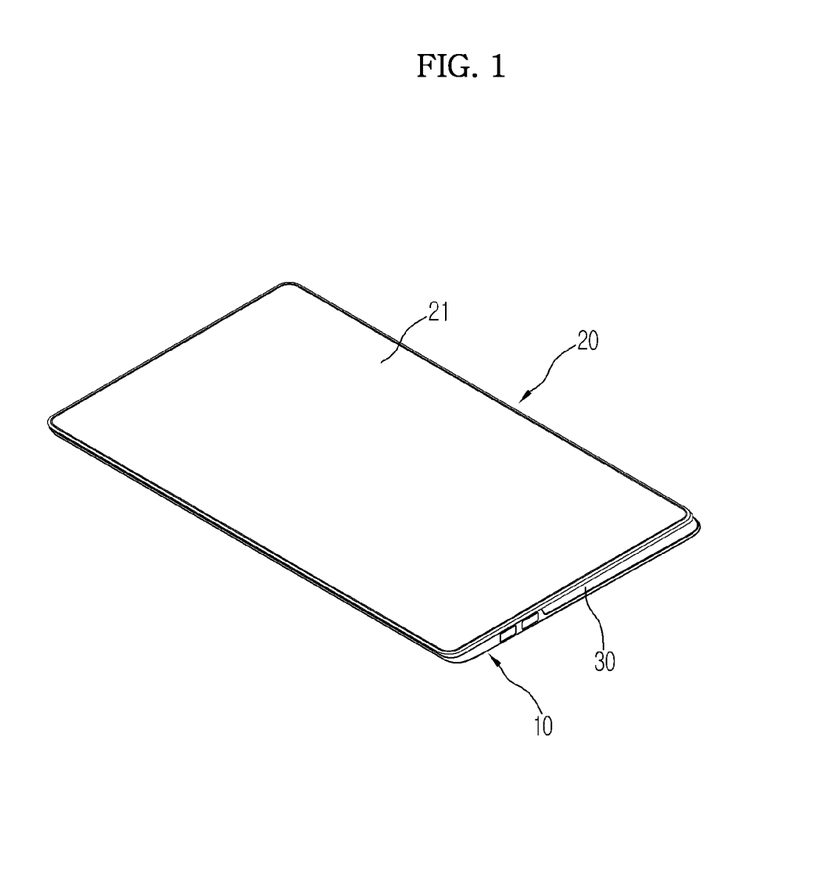
FIG. 1 is a perspective view illustrating a tablet apparatus in a state in which a second member is in a first position according to an embodiment of the present general inventive concept.

When the first member 10 is disposed on the second member in a state illustrated in FIG. 1, the touch screen of the display portion 21 is exposed to an outside thereof. It is possible that one or more buttons including a power on/off switch of the tablet apparatus may be exposed to control the table apparatus or that one or more terminals connectable to a USB memory unit may also be exposed. The first member 10 and the second member 20 may be electrically connected to control the tablet apparatus. The first member 10 and the second member 20 may communicate with each other using a wireless communication method and/or a wired communication method. It is possible that the second member 20 may be operable independently from the first member 10. The tablet apparatus may have one or more power units or battery units to provide a power supply to the first member 10 and/or the second member 20. The power units or battery units may be disposed in the first member 10 and/or the second member 20 to perform the function of the tablet apparatus.

The first and second members 10 and 20 are connected to each other through one or more link members 30. Each of the link members 30 includes a first end positioned formed at one side thereof to be connected to a rear side of the upper surface of the first member 10 to be rotatable in a forward and rearward direction while being mounted, and a second end positioned at the other side opposite to the first end to be connected to a lower surface of the second member 20 to be rotatable in the forward and rearward direction. In the present embodiment, the link members 30 include a pair of link members 30, and both sides of the upper surface of the first member 10 and both sides of the lower surface of the second member 20 are respectively connected to each other through the two link members 30. The link member 30 may have a bar shape. The first member 10 may have a portion 10a having a width W1 and a height H to receive the link member 30 having a width W2 and a thickness D. The link member 30 may be disposed in a space corresponding to the portion 10a when the second member 20 is folded with the first member 10 as illustrated in FIG. 1.

Figure 2:
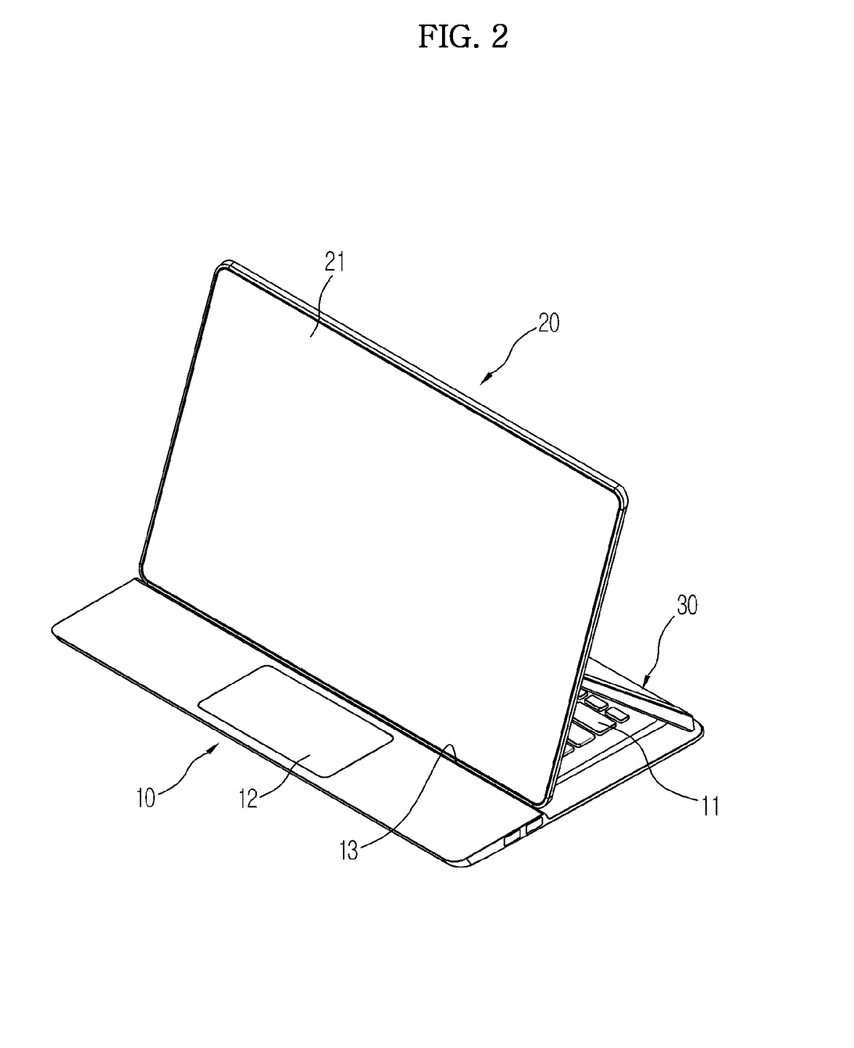
FIG. 2 is a perspective view illustrating a tablet apparatus in a state in which the second member is in a second position according to an embodiment of the present general inventive concept.
Figure 3:
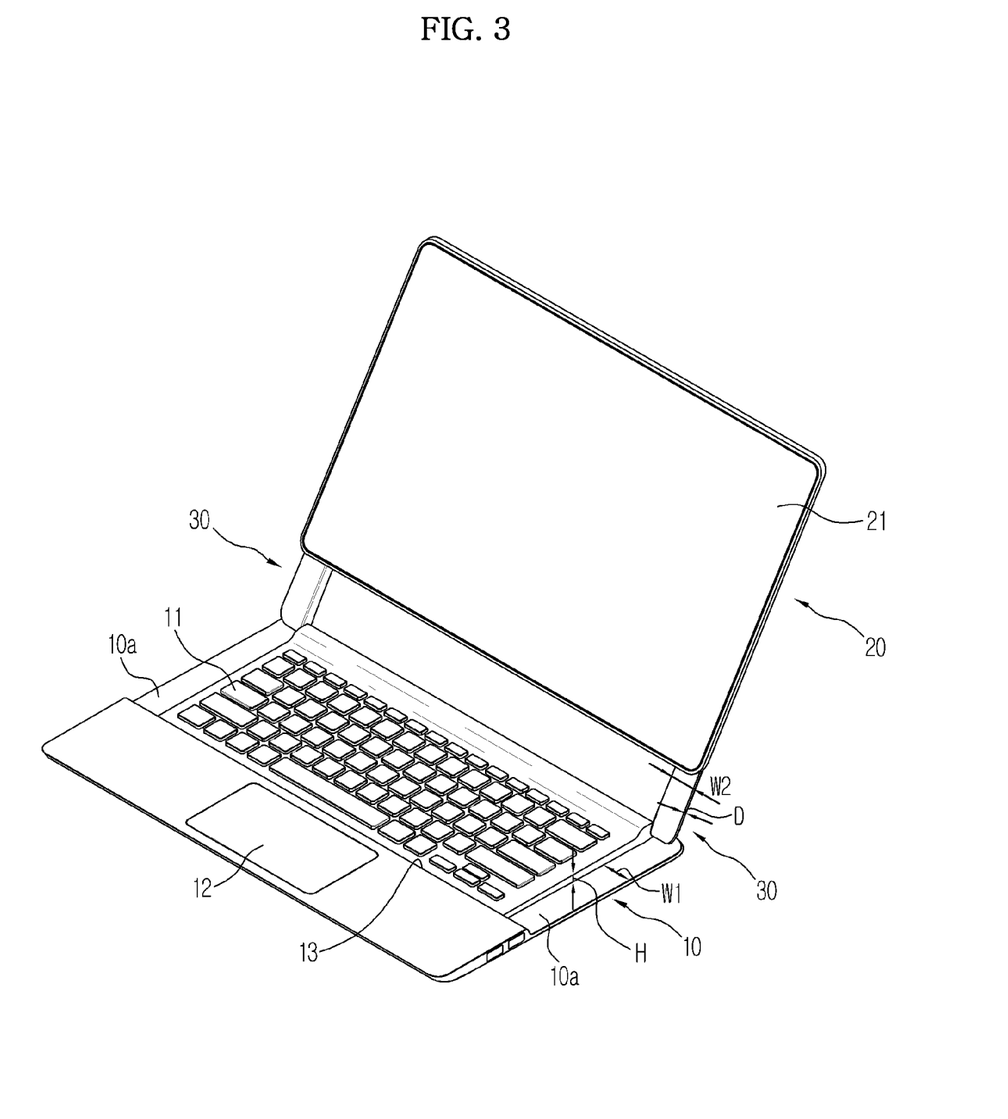
FIG. 3 is a perspective view illustrating a tablet apparatus in a state in which the second member is in a third position according to an embodiment of the present general inventive concept.

As described above, when the first and second members 10 and 20 are connected through the two link members 30, the second member 20 moves from a first position in which the second member 20 covers the upper surface of the first member 10 as illustrated in FIG. 1, to any one of a second position in which the second member 20 is obliquely erected rearward and upward on the first member 10 as illustrated in FIG. 2, and a third position in which the second member 20 is obliquely erected rearward and upward from the rear side of the first member 10 as illustrated in FIG. 3, while being guided through the two link members 30 such that the second member 20 can rotate and/or move with respect to the first member 10.

In the first position, the second member 20 is arranged in parallel with the first member 10 to cover the upper surface of the first member 10. In this state, since the keyboard 11 and the touch pad 12 provided on the first member 10 are covered by the second member 20, a user inputs commands to the tablet apparatus through the display portion 21. Therefore, the tablet apparatus may be used in the same manner as a conventional tablet apparatus.

In the second position, the second member 20 rotates to be obliquely erected rearward and upward with respect to the first member 10, and thus a front end of the second member 20 is supported by the first member 10. In order for the second member 20 to be stably maintained in the second position, a support portion 13 is provided between the keyboard 11 and the touch pad 12 of the first member 10 such that a lower end (or the front end) of the erected second member 20 is caught by the support portion 13. In the state in which the second member 20 is in the second position, the tablet apparatus may be used for a video playback operation, as an electronic picture frame or the like. The support portion 13 is disposed between a surface of the keyboard 11 and a surface of the touch pad 12. That is, the support portion 13 has a portion raised from the surface of the keyboard 11 to the surface of the touch pad 12 by a height such that the second member 20 can be supported by the support portion 13 to be maintained the second position. The height of the support portion 13 may be higher than the thickness D of the link member 30 and/or the height H of the portion 10a of the first member 10.

In the third position, the lower surface of the second member 20 is supported by the link members 30 which are obliquely disposed rearward and upward thereof. Thus, similarly to the link members 30, the second member 20 is erected to be obliquely arranged rearward and upward. In the state in which the second member 20 is in the third position, since the keyboard 11 and the touch pad 12 provided on the first member 10 are exposed, a user inputs commands and data to the tablet apparatus through the keyboard 11 and the touch pad 12 in addition to the display portion 21. Therefore, the tablet apparatus may be used in the same manner as a notebook computer. The second member 20 may form a first angle with the first member 10 in the first position, a second angle in the second position, and a third angle in the third position.

As described above, the tablet apparatus according to an embodiment of the present general inventive concept may be utilized in various manners by moving the second member 20 provided with the display portion 21 through the link members 30 to various positions.

Figure 4:
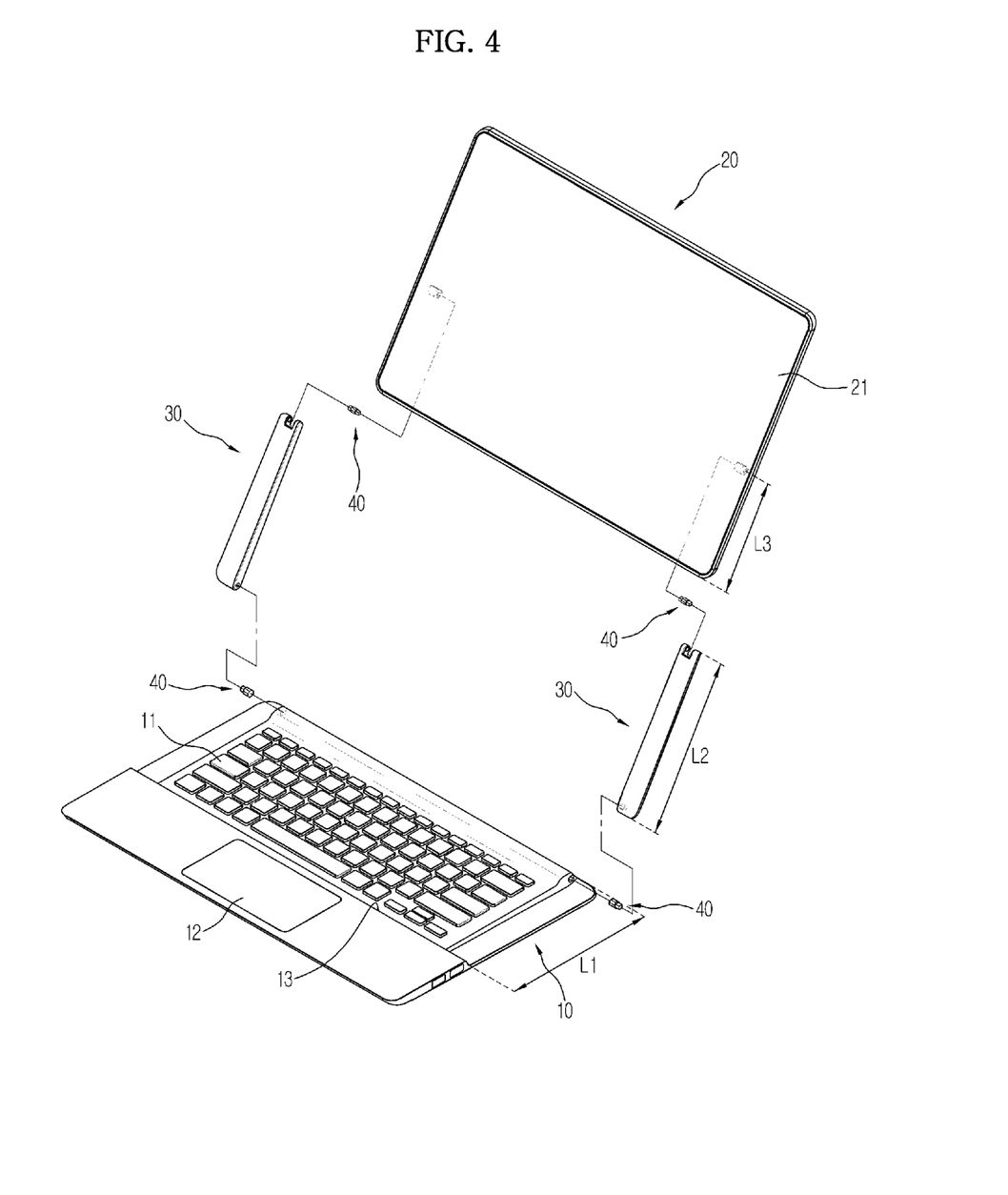
FIG. 4 is an exploded perspective view illustrating a tablet apparatus according to an embodiment of the present general inventive concept.

As illustrated in FIG. 4, one or more hinge units 40 are respectively disposed between the first and second members 10 and 20 and the two link members 30. Each of the hinge units 40 includes therein a cam (not illustrated), an elastic member (not illustrated) to elastically support the cam, and the like. The hinge unit 40 allows the associated link member 30 to maintain a state of rotating at a certain angle, so that the second member 20 may be maintained as it is in the first position, the second position, or the third position until an external force over a certain level is applied to the second member 20 with respect to the first member 10.

The first member 10 may have one or more receiving members 40a to receive the corresponding hinge units 40, and the second member 20 may have one or more receiving members 40b to receive the corresponding hinge units 40. The receiving members 40a of the first member 10 may have a recess portion to be coupled to at least a portion of the corresponding hinge unit 40. The receiving members 40b of the second member 20 may have a protrusion to be coupled to at least a portion of the corresponding hinge unit 40. A combination of the hinge units 40 and the receiving member 40a of the first member 10 may form a first rotating axis which is stationary, and a combination of the hinge units 40 and the receiving member 40b of the second member 20 may form a second rotating axis which is movable with respect to the first member 10.

The portion 10a of the first member 10 may have a length L1, and the link member 30 may have a length L2. The length L2 of the link member 30 may be shorter than the length L1 of the portion 10a of the first member 10 such that the portion 10a of the first member 10 accommodates the link member 30 when the first member 10 and the second member 20 are folded. The receiving members 40b of the second member 20 may be disposed at a portion spaced apart from a lower end of the second member 20 by a length L3. The length L3 may be shorter than the length L2 of the link member 30.

The receiving portion 40a may be disposed on a side portion of a first end of the link member 30, and the receiving portion 40b may be disposed in a center portion of a second end of the link member 30. However, the present general inventive concept is not limited thereto. It is possible that the hinge unit 40 is connected to the receiving member 40a and then connected to a center portion of the link member 30, and the hinge unit 40 is connected to the receiving member 40b and then connected to a side portion of the link member 30.

An end portion of the first member 10 connected to a first end of the link member 30 may be disposed away from a peripheral portion of the first member 10, and a middle portion of the second member 20 connected to a second end of the link member 30 disposed opposite to the first end may be disposed closer to a peripheral portion of the second member 20.

Figure 5:
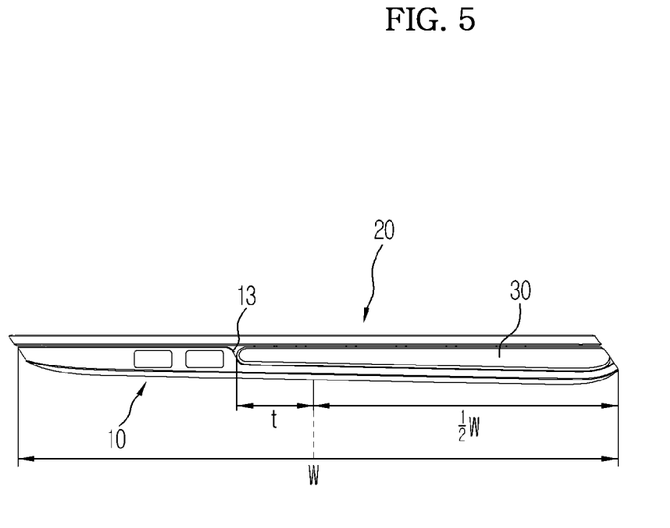
FIGS. 5 and 6 are side views illustrating a tablet apparatus according to an embodiment of the present general inventive concept.

In the present embodiment, as illustrated in FIG. 5, the link member 30 is longer by a certain length t than one half of a width (length) W of each of the first and second members 10 and 20 in the forward and rearward direction thereof, and the second end of the link member 30 is rotatably mounted to a front side of the lower surface of the second member 20.

Figure 6:
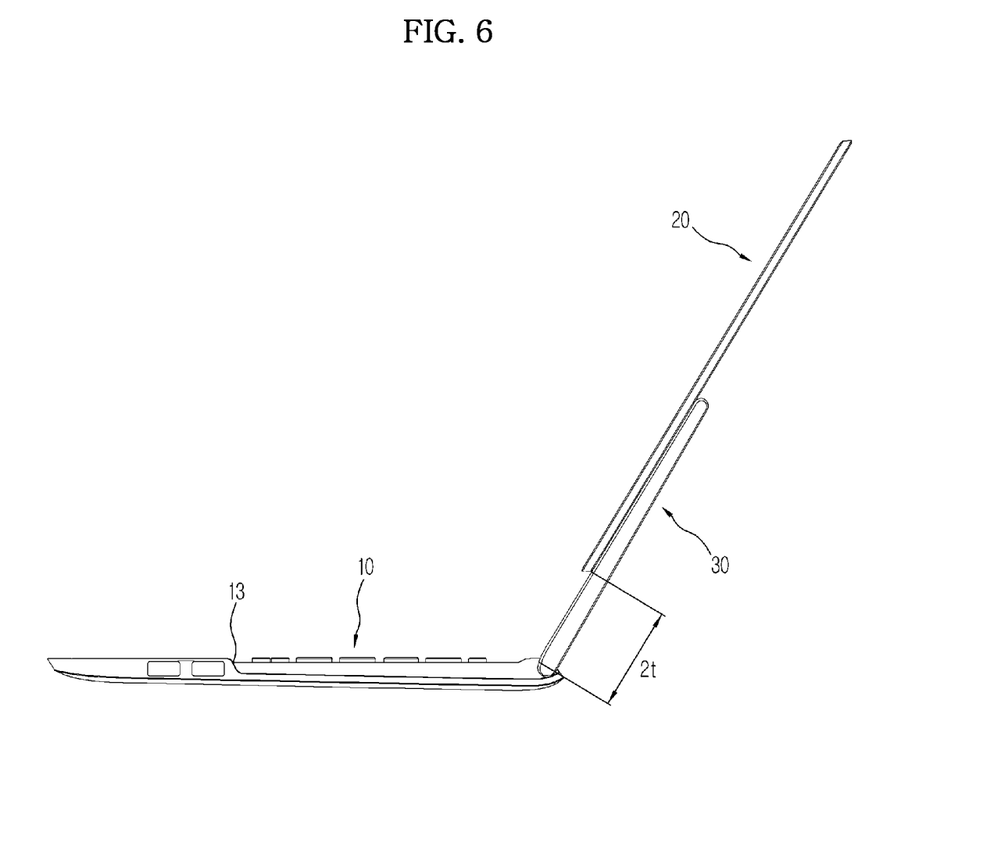

When the first and second members 10 and 20 are connected through the link member 30 having the above configuration, in the state in which the second member 20 is arranged in the third position as illustrated in FIG. 3, the second member 20 is erected to be spaced apart from a rear end of the first member 10 by a distance 2t of two times the certain length t, as illustrated in FIG. 6. Accordingly, the second member 20 is raised from the first member 10 in height so as to correspond to the spaced length 2t, and thus a user may more conveniently view the display portion 21 provided in the second member 20.

FIG. 5 illustrates the link member 30 to have a length which is longer than one half of the width (length) W of each of the first and second members 10 and 20 in the forward and rearward direction thereof and FIG. 6 illustrates the second member 20 to be raised in height in the state of being in the third position in the present embodiment. However, the present genera inventive concept is not limited thereto. For example, the link member has a length corresponding to one half of the width (length) of each of the first and second members in the forward and rearward direction thereof, and the second end of the link member is mounted to a central side of the second member in the forward and rearward direction thereof, so that the second member may come into contact with or be adjacent to the rear end of the first member. However, in this case, the tablet apparatus may be used by moving the second member to various positions. A user may be allowed to conveniently view the display portion provided in the second member by raising the height of the second member with respect to the first member 10 in the state in which the second member is in the third position as illustrated in FIGS. 3 and 6.

In addition, various modified embodiments may be realized. For example, the link member may have a length corresponding to one half of the width (length) of each of the first and second members in the forward and rearward direction thereof, the link member may be configured to be increased in length, or the second end of the link member may be movably mounted to the lower surface of the second member, so that the height of the second member provided with the display portion may be vertically adjusted.

Moreover, although the first and second members 10 and 20 are connected through the two link members 30 in the present embodiment, the present general inventive concept is not limited thereto. For example, the first and second members may be connected to each other through one link member having an H-shape. In addition, the first and second members may also be connected using a link member having various shapes.

As is apparent from the above description, a tablet apparatus according to an embodiment of the present general inventive concept may be utilized in various manners since a second member provided with a display portion moves to a first position in which the second member covers an upper surface of a first member, a second position in which the second member is erected on the first member, and a third position in which the second member is erected from a rear side of the first member.

In addition, in the tablet apparatus according to the embodiment of the present general inventive concept, since the second member is erected from the rear side of the first member in a state of being spaced apart from a rear end of the first member, the second member is raised in height such that a user may conveniently view the display portion provided in the second member.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A tablet apparatus comprising:
    a first member;
    a second member which is formed in a shape corresponding to the first member to cover an upper surface of the first member; and
    at least one link member having a first end positioned at one side and mounted to the upper surface of the first member to be rotatable in a forward and rearward direction, and a second end positioned at the other side opposite to the first end and mounted to a lower surface of the second member to be rotatable in the forward and rearward direction,
    wherein the link member has a length equal to or longer than one half of a width of each of the first and second members in a forward and rearward direction thereof; and
    the first end is mounted to a rear side of the upper surface of the first member, and the second end is mounted to a front side of the lower surface of the second member.

2. The tablet apparatus of claim 1, wherein the first member comprises a keyboard provided on the upper surface thereof to receive a user input.

3. The tablet apparatus of claim 1, wherein the second member comprises a display portion provided on an upper surface thereof to display at least one of an image, an icon, and a user interface corresponding to a function of the tablet apparatus.

4. The tablet apparatus of claim 3, wherein the display portion comprises a touchscreen.

5. The tablet apparatus of claim 1, wherein the at least one link member has a bar shape and comprises a pair of link members to connect both sides of the first and second members.

6. The tablet apparatus of claim 1, wherein the second member moves to a first position in which the second member covers the upper surface of the first member, a second position in which the second member is erected on the first member, and a third position in which the second member is erected from a rear side of the first member.

7. The tablet apparatus of claim 6, wherein the second member is erected to be spaced upward from the rear side of the first member in the third position.

8. The tablet apparatus of claim 6, wherein the first member comprises a support portion which is provided on the upper surface thereof and by which a lower end of the second member located in the second position is caught and supported.

* * * * *